United States Patent Office 3,702,346
Patented Nov. 7, 1972

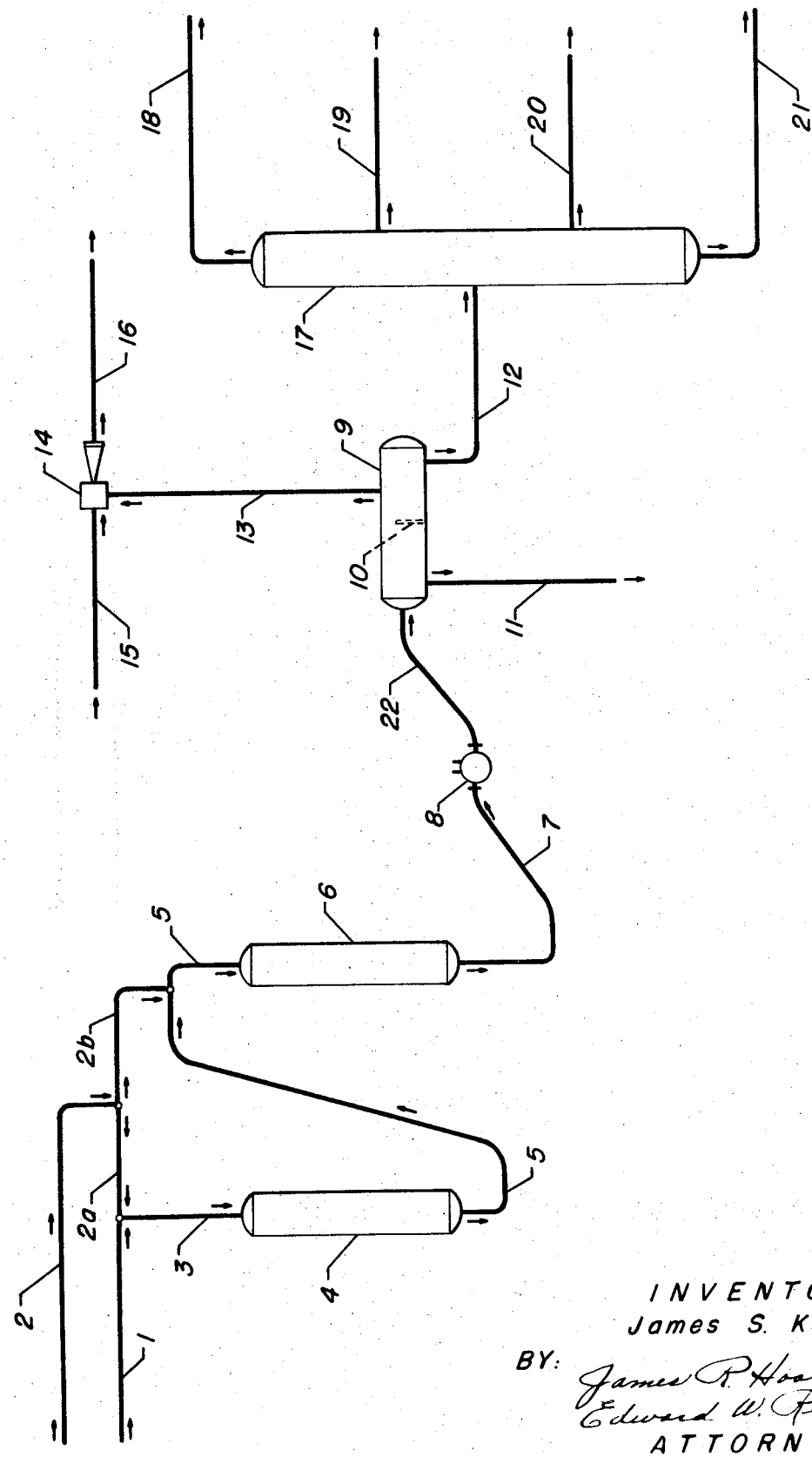

3,702,346
CONVERSION OF ETHYLBENZENE TO STYRENE
James S. Kellar, Des Plaines, Ill., assignor to Universal
Oil Products Company, Des Plaines, Ill.
Filed June 30, 1971, Ser. No. 158,303
Int. Cl. C07c 15/10
U.S. Cl. 260—669 R
5 Claims

ABSTRACT OF THE DISCLOSURE

In a process for the steam dehydrogenation of ethylbenzene to styrene, the selectivity of the dehydrogenation reaction is improved by maintaining the reactor products settler, wherein condensed reactor products are separated, at a pressure less than atmospheric.

BACKGROUND OF THE INVENTION

The present invention pertains to the dehydrogenation of an alkylaromatic hydrocarbon to form an alkenylaromatic hydrocarbon. More particularly, the present invention pertains to the steam dehydrogenation of ethylbenzene to form styrene.

Processes for the production and synthesis of alkenylaromatics have gained considerable importance in the petrochemical art. This demand for alkenylaromatics stems from the use of these hydrocarbons as starting materials in the manufacture of a multitude of resins, plastics, elastomers, synthetic rubbers, etc. For example, styrene, which is a desired product produced by the improved process of the present invention, is in wide-spread demand as a polymeric starting material. One of the principal uses of styrene, which is typically produced by the dehydrogenation of ethylbenzene, is in the copolymerization of styrene with butadiene to form high molecular weight synthetic rubber. Similarly, other polymeric materials may be made either by the polymerization of styrene with itself or by the copolymerization of styrene with isoprene, acrylonitrile, vinyl chloride or the like.

It is well recognized in the art that in the dehydrogenation of ethylbenzene to form styrene, the selectivity of the reaction is promoted by operating at low pressures. As used herein, selectivity refers to the percent reactants, i.e., ethylbenzene, which are converted to the desired product, i.e., styrene. As those skilled in the art are aware, the increase in pressure within dehydrogenation reaction zone frequently causes an increase in the severity of other operating conditions necessary to convert ethylbenzene to styrene. This increased severity often causes an increase in the formation of undesirable by-products including gaseous compounds, benzene, toluene, polymers and tar, as well as increasing the tendency for tar formation in the attendant product separation facilities.

In a typical alkylaromatic dehydrogenation process, low pressures in the reactor system are obtainable by drawing a vacuum on the final gaseous reactor effluent or, in a multistage dehydrogenation reaction, by drawing a vacuum on the effluent from each reactor. However, these prior art methods of lowering the pressure in the dehydrogenation reaction zone are often prohibitively expensive, both to install and to operate.

SUMMARY OF THE INVENTION

Accordingly, it is an object of the present invention to provide an improved method for effecting the dehydrogenation of alkylaromatic hydrocarbons to form alkenylaromatic hydrocarbons at low pressure.

More particularly, it is an object of the present invention to provide an improved method for lowering the pressure on a reaction zone utilized for the steam dehydrogenation of ethylbenzene to form styrene.

In an embodiment, therefore, the present invention relates to an improvement in a process for the dehydrogenation of an alkylaromatic hydrocarbon in the presence of steam to produce an alkenylaromatic hydrocarbon (such as the conversion of ethylbenzene to styrene) wherein the alkylaromatic and steam are contacted in a dehydrogenation zone to produce an effluent comprising steam and hydrocarbon, and the effluent is condensed and separated in a products settler to produce a vent gas stream, an aqueous stream and a hydrocarbon stream. The particular improvement comprises maintaining the products settler at a pressure less than atmospheric whereby the selectivity of the dehydrogenation reaction is increased. Preferably, the products settler is maintained at a pressure of about 200 mm. Hg to about 600 mm. Hg absolute.

Othe objects, embodiments and a more detailed description of the foregoing embodiments will be found in the following more detailed description of the present invention.

DETAILED DESCRIPTION OF THE INVENTION

The exact dehydrogenation reaction zone and dehydrogenatable alkylaromatic hydrocarbon to be dehydrogenated in the reaction zone are not necessarily critical to the process of the present invention. Thus, while the present invention is particularly applicable to the steam dehydrogenation of ethylbenzene to form styrene, it is likewise applicable to the dehydrogenation of other dehydrogenatable alkylaromatic hydrocarbons such as ethyltoluene and the like.

The dehydrogenation zone is preferably a catalytic reaction zone containing a dehydrogenation catalyst which is preferably an alkali metal promoted iron catalyst. However, the exact catalyst is not critical to the practice of the present invention. Catalysts preferably employed are of the type commonly known as "Shell 105" or "Shell 205." Typical catalysts consist essentially of 85% by weight ferric oxide, 2% by weight chromia, 12% by weight potassium hydroxide and 1% by weight sodium hydroxide, or 90% by weight iron oxide, 4% by weight of chromia and 6% by weight of potassium carbonate. While these known, commercial dehydrogenation catalysts are preferred, other known dehydrogenation catalysts may be utilized including those comprising ferric oxide, potassium oxide, other metal oxides and/or sulfides including those of calcium, lithium, strontium, magnesium, beryllium, zirconium, tungsten, molybdenum, titanium, hafnium, vanadium, lanthanum, chromium, copper and mixtures of two or more including chromia-alumina, chromia-titania, alumina-vanadia and the like. Similarly, methods for preparing the above enumerated catalysts are all well known to those trained in the art.

The dehydrogenation of ethylbenzene to styrene is effected by contacting the ethylbenzene and steam in either a single stage or a multiple stage reaction system. This reactor system is maintained at a temperature of about 1000° F. to about 1800° F., and preferably about 1200° F. The exact dehydrogenation conditions, however, are a function of the exact alkylaromatics being dehydrogenated and, in addition to the foregoing temperatures, preferred are pressures of about atmospheric to about 5 atmospheres, and liquid hourly space velocities, based on hydrocarbon charge, of about 0.1 hr.$^{-1}$ to about 5 hr.$^{-1}$. Steam to hydrocarbon weight ratios of from about 1:1 to about 30:1 are utilized. Preferably, in the dehydrogenation of ethylbenzene to form styrene, the pressure on the reactor system is maintained at an average reactor pressure of about 0 to 20 p.s.i.g., and particularly average reactor pressures from about 2 to about 10 p.s.i.g. Operation in this pressure range, particularly when converting ethylbenzene to styrene, insures a commercially acceptable selective conversion of ethylbenzene to styrene.

In a typical commercial installation, the number of reaction zones or catalyst beds may vary from 1 to 5, and typically comprises 3 reaction zones. Therefore, the total steam required for the reaction may either be supplied to the lead or first reactor or proportioned between each of the reaction zones. Similarly, the steam and ethylbenzene can be separately heated and commingled prior to contacting the reactants with the catalysts, or the steam and ethylbenzene can be first commingled and then heated to the desired reaction temperature before contacting the dehydrogenation catalyst. In a typical ethylbenzene dehydrogenation situation, the space velocity is correlated with a selected inlet temperature to result in a reactor product effluent having a temperature within the range of about 1000° F. to about 1400° F., and typically about 1100° F.

Since the dehydrogenation reaction such as the dehydrogenation of ethylbenzene to styrene is endothermic, it is preferred that the steam required for the reaction to be proportioned between each of the plurality of reaction zones which may be utilized, to provide the necessary reheating to maintain an efficient dehydrogenation reaction. Preferably, when utilizing a 3-reaction zone system, the steam may be admixed with the fresh charge to the first reaction zone in an amount from about 0.6 to about 1 pound of steam per pound of hydrocarbon; a second portion is combined with the first reactor effluent at a rate of about 1 to about 1.2 pounds of steam per pound of effluent, and the third portion should be added to the effluent from the second reaction zone at a rate from about 0.8 to about 1.3 pounds per pound such that the total product effluent contains from about 4 to about 6 pounds of steam per pound of styrene in the final effluent stream.

In any event, no matter what the particular conversion reaction is, the effluent from the dehydrogenation reaction zone is first condensed and separated. For example, in the dehydrogenation of ethylbenzene to form styrene, the final reactor product effluent emanates from the terminal reactor at a temperature in the range of about 1000° F. to 1200° F. and is condensed by cooling to a temperature of about 100° F. The cooling of the effluent produces, after settling, a normally liquid hydrocarbon phase, a liquid water phase and a normally gaseous phase. This normally gaseous phase, referred to in the art as an off-gas stream or vent gas stream, comprises hydrogen, methane, ethane, ethylene, carbon monoxide, carbon dioxide and the like which are inadvertently formed by side reactions during the dehydrogenation reaction. To maintain the selectivity of the dehydrogenation reaction at a commercially acceptable level and to minimize the amount of gaseous products recovered in the reactor products settler, a vacuum is drawn on the off-gas stream so as to maintain the reactor products settler at a pressure below atmospheric pressure. Preferably, the reactor products settler is maintained at an absolute pressure of about 200 mm. Hg to about 600 mm. Hg. In a typical commercial installation utilizing a plurality of reaction zones, particularly 3, and indirect heat exchange on the final reaction zone product to condense the dehydrogenation zone effluent, maintaining the pressure on the reactor products settler in the described 200–600 mm. Hg range, is sufficient to maintain an average pressure in the reaction zone in the range of about 1 to about 20 p.s.i.g. and preferably in the range of about 2 to 10 p.s.i.g.

The pressure on the reactor products settler may be maintained in a sub-atmospheric pressure range by means well known to those trained in the art, such as mechanical compression means drawing a suction on the off-gas stream or, preferably, by utilizing a steam-jet ejector means.

DESCRIPTION OF THE DRAWING

The improvement of the present invention can be best described by reference to the attached schematic flow diagram illustrating the dehydrogenation of ethylbenzene to form styrene.

Of necessity, certain limitations must be present in a schematic diagram of the type presented and no intention is made thereby to limit the generally broad scope of this invention to specific feedstocks, flow rates, operating conditions, catalysts, etc. Miscellaneous appurtenances including valves, controllers, pumps, compressors, separators, reboilers, etc., have been eliminated and only those vessels and lines necessary for a complete and clear understanding of this invention are shown.

With reference to the attached schematic diagram, ethylbenzene in admixture with steam condensate recovered by means not shown enters the process of the present invention via line 1 and is admixed with steam entering via line 2a and derived from an external steam source, not shown, via line 2. The resultant mixture is passed via line 3 and is heated by means not shown to dehydrogenation conditions such as a temperature of about 1100° F., and is contacted in dehydrogenation reactor 4 with a dehydrogenation catalyst of conventional design. Alternatively, the ethylbenzene and steam may be separately heated to dehydrogenation conditions and then mixed prior to passage to reactor 4. The resultant, first reactor effluent is removed via line 5 and is admixed with additional superheated steam entering via line 2b and the thus reheated mixture is passed via line 5 to terminal dehydrogenation reactor 6. As illustrated, two dehydrogenation reactors are utilized although it is to be obvious to those trained in the art that 3 or more reactors may be utilized.

The effluent from the terminal dehydrogenation reactor 6 emanates via line 7 at a temperature in the range of about 1000° F. to about 1100° F. and is cooled to a temperature of about 100° F. by indirect heat exchange means 8. In a commercial embodiment, heat exchange means 8 typically comprises a plurality of heat exchange zones. For example, the effluent from the terminal reactor may be first contacted with fresh ethylbenzene feed to partially cool the reactor effluent with the reactor effluent being lowered to a final temperature of about 100° F. via a trim cooler in a manner well known to those trained in the art. The thus cooled and condensed reaction product effluent is passed via line 22 to reactor products settler 9 containing a weir 10. In reactor product settler 9, the cooled dehydrogenation reactor effluent is separated into an aqueous phase which is removed via line 11, and a hydrocarbon phase which is removed via line 12. The hydrocarbon phase is then passed to the fractionation zone 17 wherein a benzene-toluene fraction is recovered via line 18; an ethylbenzene fraction is recovered via line 19 and is typically recycled by means not shown to dehydrogenation reactor 4 or 6; a styrene product fraction is recovered via line 20 and a heavy residue fraction is recovered via line 21. It is to be realized that fractionation column 17 in a typical commercial embodiment comprises a plurality of fractionation columns to effect the described fractional distillation.

A gaseous off-gas stream is removed from reactor products settler 9 via line 13 and comprises a small amount of water, hydrogen, methane, ethane, ethylene, carbon monoxide and carbon dioxide. Reactor products settler 9 is maintained at an absolute pressure of about 200 to about 600 mm. Hg by steam jet-ejector means 14. Steam jet-injector 14 consists of a steam nozzle that discharges a high velocity steam jet entering via line 15 across a suction chamber that is connected to the reactor products settler via line 13. Line 13 may contain a liquid knockout pot not shown to remove undesirables inadvertently withdrawn from settler 9. The off-gas withdrawn via line 13 from reactor products settler 9 is entrained by the steam and is carried into a venturi-shaped diffuser which converts the velocity energy from the steam into a pressure energy and discharges the resultant mixture via line 16. The benefits afforded by the practice of the present invention can be best presented by comparison to an alternative mode of operation. In a commercial installation wherein the total reactor effluent removed from the terminal dehydrogenation reactor was about 54,000 pounds per hour, the total vapor removed from settler 9 via line 13 amounted to about 1500 pounds per hour. To maintain settler 9 at a pressure in a range of 200 mm. Hg to 600 mm. Hg it was necessary to utilize about 3000 to about 4500 pounds per hour of steam in steam jet-ejector 14. By maintaining the settler 9 in this desired pressure range of 200–600 mm. Hg the average pressure across three dehydrogenation reactors was maintained at about 5 p.s.i.g., (i.e., 10 p.s.i.g. inlet to the first and 0 p.s.i.g. outlet from the third). To maintain the same, average 5 pound pressure across the three reactor dehydrogenation system by drawing a vacuum on the uncooled, unseparated terminal reactor effluent would require about 120,000 to about 180,000 pounds per hour of steam. Thus it is obvious that by maintaining a low pressure in the reactor section by proper manipulation of the pressure on the reactor product settler communicating with the reactor section, a significant utility savings and equipment savings is obtained. This concept is particularly applicable wherein the dehydrogenation zone is maintained at slightly elevated pressures as illustrated.

I claim as my invention:

1. In a process for the dehydrogenation of an alkylaromatic hydrocarbon in the presence of steam to produce an alkenylaromatic hydrocarbon wherein the alkylaromatic and steam are contacted in a dehydrogenation zone to produce an effluent comprising steam and hydrocarbon and the effluent is condensed and separated in a products settler to produce a vent gas stream, an aqueous stream and a hydrocarbon stream, the improvement which comprises maintaining the product settler at a pressure less than atmospheric whereby the selectivity of the dehydrogenation increases.

2. The improvement of claim 1 wherein the alkylaromatic is ethylbenzene and alkenylaromatic is styrene.

3. The improvement of claim 1 wherein the products settler is maintained at a pressure of about 200 mm. Hg to about 600 mm. Hg absolute.

4. The improvement of claim 1 wherein the alkylaromatic is ethylbenzene, the alkenylaromatic is styrene and the products settler is maintained at a pressure of about 200 mm. Hg to about 600 mm. Hg absolute.

5. The improvement of claim 1 wherein the subatmospheric pressure on the product settler is maintained by a steam-jet ejector.

References Cited

UNITED STATES PATENTS

| | | | |
|---|---|---|---|
| 3,408,263 | 10/1968 | Ward | 260—669 R |
| 3,515,765 | 6/1970 | Berger | 260—669 R |

CURTIS R. DAVIS, Primary Examiner